United States Patent
Ko et al.

(10) Patent No.: US 10,897,749 B2
(45) Date of Patent: Jan. 19, 2021

(54) METHOD AND APPARATUS FOR ALLOCATING RESOURCE IN WIRELESS COMMUNICATION SYSTEM

(71) Applicant: Samsung Electronics Co., Ltd., Gyeonggi-do (KR)

(72) Inventors: Soomin Ko, Gyeonggi-do (KR); Byunggook Kim, Gyeonggi-do (KR); Jaewon Kang, Gyeonggi-do (KR); Hojoong Kwon, Gyeonggi-do (KR); Yongsang Kim, Gyeonggi-do (KR); Myungkwang Byun, Gyeonggi-do (KR); Jinbong Chang, Gyeonggi-do (KR); Youngmin Cho, Gyeonggi-do (KR); Jaehee Cho, Gyeonggi-do (KR); Kiseob Hong, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/382,911

(22) Filed: Apr. 12, 2019

(65) Prior Publication Data
US 2019/0320418 A1    Oct. 17, 2019

(30) Foreign Application Priority Data
Apr. 12, 2018    (KR) .................. 10-2018-0042907

(51) Int. Cl.
H04W 72/04    (2009.01)
H04W 4/70    (2018.01)

(52) U.S. Cl.
CPC ............. *H04W 72/04* (2013.01); *H04W 4/70* (2018.02)

(58) Field of Classification Search
CPC .............................. H04W 72/04; H04W 4/70
See application file for complete search history.

(56) References Cited

U.S. PATENT DOCUMENTS

2018/0062707 A1*    3/2018    Chen .................. H04B 7/024

FOREIGN PATENT DOCUMENTS

KR    1020150087795    7/2015

* cited by examiner

*Primary Examiner* — Ronald B Abelson
(74) *Attorney, Agent, or Firm* — The Farrell Law Firm, P.C.

(57) ABSTRACT

Disclosed is a method of allocating time resources of a downlink (DL) physical control channel, including scheduling transmission of DL data in a first time resource, and scheduling transmission of uplink (UL) data in a second time resource starting after the first time resource ends, wherein an end time point of the first time resource is changed based on an amount of the DL data and is less than or equal to a first maximum value.

20 Claims, 10 Drawing Sheets

METHOD AND APPARATUS FOR ALLOCATING RESOURCE IN WIRELESS COMMUNICATION SYSTEM

CROSS-REFERENCE TO RELATED APPLICATION(S)

This application is based on and claims priority under 35 U.S.C. 119 to Korean Patent Application No. 10-2018-0042907, filed on Apr. 12, 2018 in the Korean Intellectual Property Office, the disclosure of which is incorporated by reference herein in its entirety.

BACKGROUND

1. Field

The disclosure relates generally to a wireless communication system and, more particularly, to a method and an apparatus for allocating resources in a wireless communication system.

2. Description of Related Art

In order to meet wireless data traffic demands that have increased after 4th generation (4G) communication system commercialization, efforts to develop an improved 5th generation (5G) communication system or a pre-5G communication system have been made. For this reason, the 5G communication system or the pre-5G communication system is referred to as a beyond-4G-network communication system or a post-long term evolution (LTE) system.

In order to achieve a high data transmission rate, an implementation of the 5G communication system in a mmWave band such as 60 GHz band is being considered. In the 5G communication system, technologies such as beamforming, massive multi-input multi-output (MIMO), full dimensional MIMO (FD-MIMO), array antenna, analog beam-forming, and large scale antenna technologies are being discussed in the mmWave band to mitigate propagation path loss and increase propagation transmission distance.

The 5G communication system has developed technologies such as an evolved small cell, an advanced small cell, a cloud radio access network (RAN), an ultra-dense network, device to device communication (D2D), a wireless backhaul, a moving network, cooperative communication, coordinated multi-points (CoMP), and interference cancellation to improve the system network.

In addition, the 5G system has developed advanced coding modulation (ACM) schemes such as hybrid frequency shift keying (FSK) and frequency and quadrature amplitude modulation (FQAM) and sliding window superposition coding (SWSC), and advanced access technologies such as filter bank multi carrier (FBMC), non-orthogonal multiple access (NOMA), and sparse code multiple access (SCMA).

The Internet has evolved into an Internet of things (IoT) network in which distributed components such as objects exchange and process information from a human-oriented connection network in which humans generate and consume information. The Internet of everything (IoE) technology is an example of a combination of the IoT and big data processing through a connection with a cloud server.

In order to implement the IoT, technical factors such as a sensing technique, wired/wireless communication and network infrastructure, service interface technology, and security technology are required, and thus research is being conducted on a sensor network, machine to machine (M2M) communication, machine type communication (MTC), and the like for a connection between objects.

In an IoT environment, through collection and analysis of data generated in connected objects, an intelligent Internet technology service to create new value in human lives may be provided. The IoT may be applied to fields, such as smart homes, smart buildings, smart cities, smart cars, connected cars, smart grids, health care, smart home appliances, and high-tech medical services, through the convergence of the conventional information technology (IT) and various industries.

Accordingly, various attempts to apply the 5G communication to the IoT network are being made. For example, 5G communication technologies such as a sensor network, M2M, and MTC are implemented by schemes such as beamforming, MIMO, and array antenna. The application of a cloud random access network (RAN) as big data processing may be an example of convergence of the 5G technology and the IoT technology.

MTC technology may provide other communication systems, which are not general mobile Internet communication services, through the conventional LTE system. Particularly, enhanced MTC (eMTC) technology included in MTC technology may provide a wireless communication means for providing an IoT service.

Specifically, things included in an eMTC User Equipment (UE) applied to the eMTC technology may access a radio network without time and space constraints through wireless communication with a base station.

Accordingly, there is a need in the art for a method in which the base station may relay both the conventional LTE communication (hereinafter, "broadband communication" or "LTE") and narrow band communication (hereinafter, "eMTC communication" or "eMTC") with an eMTC UE.

SUMMARY

An aspect of the disclosure is to address at least the above-mentioned problems and/or disadvantages and to provide at least the advantages described below. Accordingly, an aspect of the disclosure is to provide a method to efficiently use resources by dynamically allocating physical channel resources required for uplink (UL) communication and downlink (DL) communication.

Another aspect of the disclosure is to provide a detailed method of allocating resources areas for narrow band communication using some resource areas of broadband communication by a base station.

In accordance with an aspect of the disclosure, a method of allocating time resources of a DL physical control channel includes scheduling transmission of DL data in a first time resource, and scheduling transmission of UL data in a second time resource starting after the first time resource ends, wherein an end time point of the first time resource is changed based on an amount of the DL data and is less than or equal to a first maximum value.

In accordance with another aspect of the disclosure, a base station (BS) for allocating time resources of a DL physical control channel includes a transceiver configured to transmit or receive data, and a controller configured to schedule transmission of DL data in a first time resource and schedule transmission of uplink (UL) data in a second time resource starting after the first time resource ends, wherein an end time point of the first time resource is changed based on an amount of the DL data and is less than or equal to a first maximum value.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Hereinafter, embodiments of the disclosure will be described in detail with reference to the accompanying drawings. Detailed descriptions of known functions and configurations incorporated herein will be omitted when it may make the subject matter of the present disclosure rather unclear.

The terms described below are defined in consideration of functions in the disclosure and thus may vary depending on users, operator's intention, or convention. Therefore, the definitions of the terms should be made based on the contents throughout the specification.

As a main usage scenario of 5G new radio (NR), technology for meeting main performance indexes of enhanced mobile broadband (eMBB), ultra reliable low latency communication (URLLC), massive machine type communication (mMTC), and enhanced MTC (eMTC) has been developed.

In connection with eMTC technology, research has been conducted to support low-cost devices arranged at a high density and has expanded based on conventionally expanded MTC discussions.

Specifically, eMTC technology is for enhancing a characteristic of M2M communication or D2D communication rather than an MTC technology. eMTC UEs including less expensive hardware have been produced by limiting a usage bandwidth such as 6 resource blocks (RBs). Repetitive transmission may be applied in order to increase coverage of eMTC UEs having the limited usage bandwidth.

Figure 1:
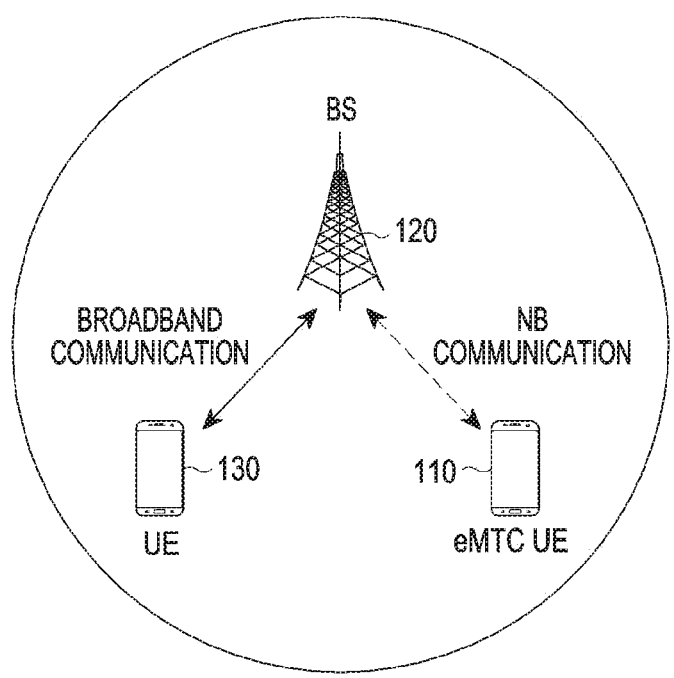
FIG. 1 illustrates narrow band (NB) communication according to an embodiment.

FIG. 1 illustrates narrow band communication according to an embodiment.

Referring to FIG. 1, a base station 120 is a subject for performing wireless communication with a UE 130 and an eMTC UE 110 and may be referred to as a BS, NB, eNodeB (eNB), or an access point (AP).

The UE 130 (hereinafter, "LTE UE") is a subject for performing LTE communication with the BS and may be referred to as a UE, a mobile station (MS), a mobile equipment (ME), a device, or a terminal.

The eMTC UE 110 is a subject for performing narrow band communication with the BS 120 and may be referred to as a low-cost device, a low-complexity device, or a bandwidth limited-coverage extension (BL-CE) UE reflecting an enhanced characteristic of M2M communication.

It is assumed that the eMTC UE 110 may be a low-cost device and may have a characteristic to be designed with low complexity. In order to reduce costs of the eMTC UE 110, a supportable radio frequency band may be limited to some areas of LTE communication, and at this time a band supporting eMTC communication may be referred to a narrow band (NB) which is relatively narrower than the frequency band of LTE communication.

The eMTC UE 110 is for low cost and low-power consumption and may include an eMTC UE and an NB-IoT UE in 3GPP. The eMTC UE 110 may be an NB-IoT UE that may receive frequency resources of 1 RB. Hereinafter, for convenience of description, the eMTC UE 110 is described by way of an example, which does not exclude an embodiment applied to terminals other than the eMTC UE 110. The embodiment can be applied to other UEs performing wireless communication or UEs supporting NB communication.

NB communication may be defined as a band of 1.4 MHz which is a part of the conventional system band, and the eMTC UE 110 may include an RC transceiver for receiving a signal in the band of 1.4 MHz. That is, the eMTC UE 110 may use a transceiver capable of receiving the band of 1.4 MHz rather than all system bands. The eMTC UE 110 may receive a signal while moving between NBs.

In connection with this, a method is needed for coverage enhancement (CE) of the eMTC UE 110 having a narrower band in which transmission and reception are possible compared to the UE 130 supporting the conventional LTE communication.

The BS 120 may identify the eMTC UE 110 supporting CE mode A or CE mode B according to a coverage enhancement requirement value of the eMTC UE 110 and support the eMTC UE 110 using a transmission method suitable for each mode and a parameter for coverage enhancement corresponding to a difference value between the modes. The eMTC UE 110 may include all eMTC UEs operating in CE mode A and CE mode B, and may include a category M1 UE.

The eMTC UE classified as CE mode A may be defined as a device having a relatively low coverage enhancement requirement value compared to the eMTC UE classified as CE mode B and having similar coverage as the UE 130 performing the conventional LTE communication. The eMTC UE classified as CE mode B is an eMTC UE having a relatively high coverage enhancement requirement value.

Since control signals are transmitted over the whole band in the LTE communication scheme, the eMTC UE communicating only in the NB may receive only some of the control signals and thus cannot receive sufficient control signals. Accordingly, as a method of commonly enhancing coverage of both the eMTC UEs operating CE mode A and CE mode B, the BS 120 may use repetitive transmission and a frequency hopping scheme. The repetitive transmission increases received signal intensity and the frequency hopping provides a frequency diversity gain, and as a result coverage increases.

Figure 2A:
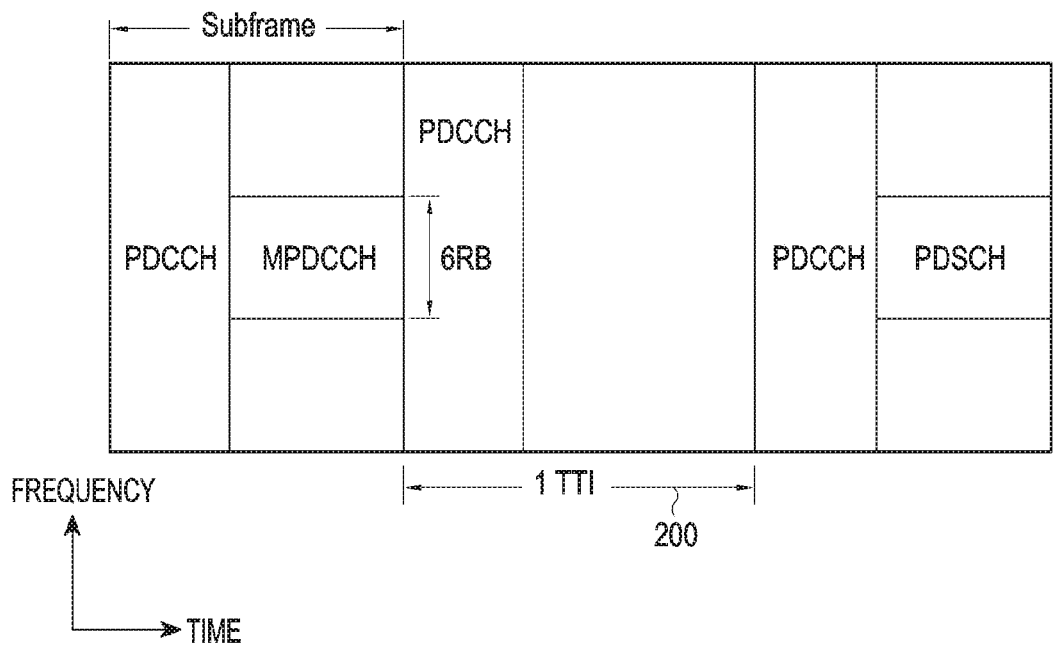
FIGS. 2A and 2B illustrate resource areas used for NB communication according to an embodiment.
Figure 2B:
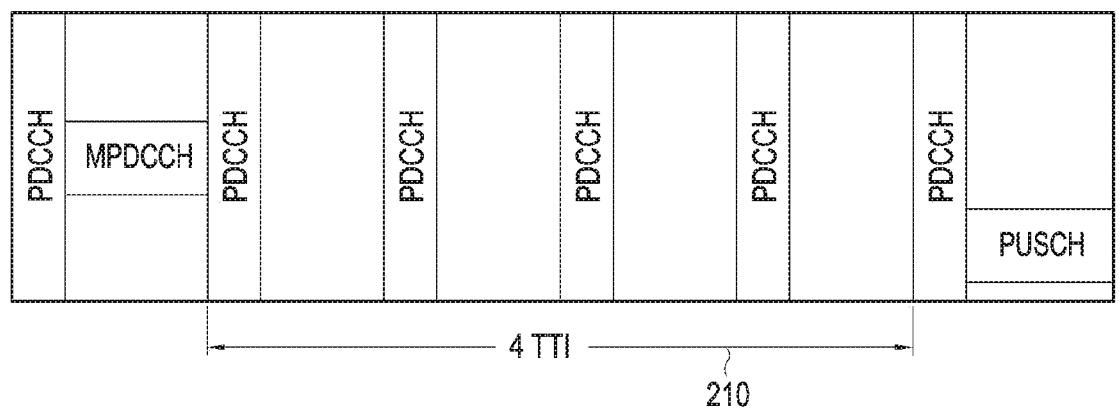

FIGS. 2A and 2B illustrate resource areas used for NB communication according to an embodiment.

eMTC communication uses some frequency area resources of LTE communication and thus has limited available resources. In consideration of a characteristic of eMTC communication in which there are many eMTC UEs accessing the BS, efficient resource allocation is needed.

Compared to the conventional MTC UE, the eMTC UE may be required to reduce hardware costs and decrease a bandwidth supported by the UE in order to reduce battery consumption. The eMTC UE transmits a small size of data and occasionally transmits and receives data, thereby supporting a narrower bandwidth such as 1.4 MHz than a bandwidth such as 20 MHz supported by the LTE UE.

Referring to FIGS. 2A and 2B, a system bandwidth supported by the BS may be larger than the bandwidth supported by the eMTC UE, which may support one bandwidth smaller than 20 MHz and a bandwidth of 1.4 MHz (or 3 MHz). It is preferable that the bandwidth supported by the eMTC UE is larger than 1.4 MHz corresponding to 6 RBs.

The BS and the eMTC UE may divide one bandwidth smaller than 20 MHz into 8 NBs to identify the 8 NBs. Embodiments of the disclosure are not limited to the number of divided NBs. One divided NB may include 6 RBs in the frequency domain. The eMTC UE may monitor a specific NB among the 8 NBs.

The eMTC can perform only the NB communication through an RF receiver considering low complexity of the device as described above, so that a control channel such as a physical downlink control channel (PDCCH) for transmitting control information and a data channel such as a physical downlink shared channel (PDSCH) for transmitting data information may be distinguished. For example, since the eMTC device has low complexity, the BS may separately transmit the control channel such as an MTC PDCCH (MPDCC) and the data channel such as a PDSCH to receive data information after the control signal at a predetermined time interval.

The MPDCCH refers to a PDCCH for the MTC UE, and may be transmitted in a resource area of a PDSCH such as an enhanced PDCCH (ePDCCH) defined in the conventional LTE communication standard. The resource area of the PDSCH may indicate a radio resource area except for an area of the PDCCH in a subframe. The eMTC communication may use a control signal through a new control channel such as an MPDCCH.

Control information transmitted through the PDCCH may be referred to as downlink control information (DCI), which may include allocation of resources of the PDSCH (referred to as a "DL grant") and allocation of resources of the PUSCH (referred to as a "UL grant").

When the BS supports downlink communication for the eMTC UE, the BS may separately transmit the MPDCCH for sending the control signal and the PDSCH for sending the data signal through different subframes. When DL resources are allocated by the BS, the MPDCCH and the PDSCH may not be transmitted through the same subframe. The MPDCCH may be transmitted through PDSCH resources in LTE communication and the PDSCH may be transmitted with one transmission time interval (TTI) according to embodiments. That is, the PDSCH in eMTC communication may be transmitted through a subframe different from a subframe through which the MPDCCH is transmitted. Since LTE communication has a relatively larger bandwidth compared to eMTC communication, the control channel may be carried only on 3 symbols. Since the bandwidth of eMTC communication is relatively smaller than the bandwidth of LTE communication, 3 symbols are not sufficient and thus the MPDCCH may be transmitted using one whole subframe. For example, one TTI in eMTC communication may be 1000 bits, and accordingly, the maximum size of the resource area which the eMTC UE can monitor may be 6 RBs, 1000 bits.

One TTI may include a plurality of successive subframes, and may be defined in basic units of resource allocation by the BS or in minimum units of data transmission in the time domain. The TTI may be defined as a transmission time required for transmitting a specific number of RBs which may indicate a minimum resource allocation unit for data transmission. In every TTI, the BS may allocate data to resource blocks according to a priority of data to be transmitted.

The BS may support an eMTC device through cross subframe scheduling in which data signals are transmitted at a predetermined time interval after a control signal.

In allocation of DL resources of the eMTC, the PDSCH may be transmitted with one TTI 200 after transmission of the DL grant as scheduling control information of the PDSCH through the MPDCCH (FIG. 2A). In allocation of UL resources of the eMTC, the physical uplink shared channel (PUSCH) may be transmitted with 4 TTIs 210 after transmission of the UL grant as scheduling control information of the PUSCH through the MPDCCH (FIG. 2B).

The DL grant may include DL resource allocation information for transmitting control information of the PDSCH through downlink. The UL grant may include UL resource allocation information for transmitting control information of the PUSCH through downlink.

The MPDCCH, the PDSCH, and the PUSCH may be allocated to the data area of LTE communication resources.

When the eMTC UE accesses a call of the BS, the eMTC UE may receive resource location information of the MDPCCH from the BS, may continuously monitor or blind-decode only the resource location of the received MPDCCH, and may know the location of resources which the eMTC UE should monitor through an RRC message.

Figure 3A:
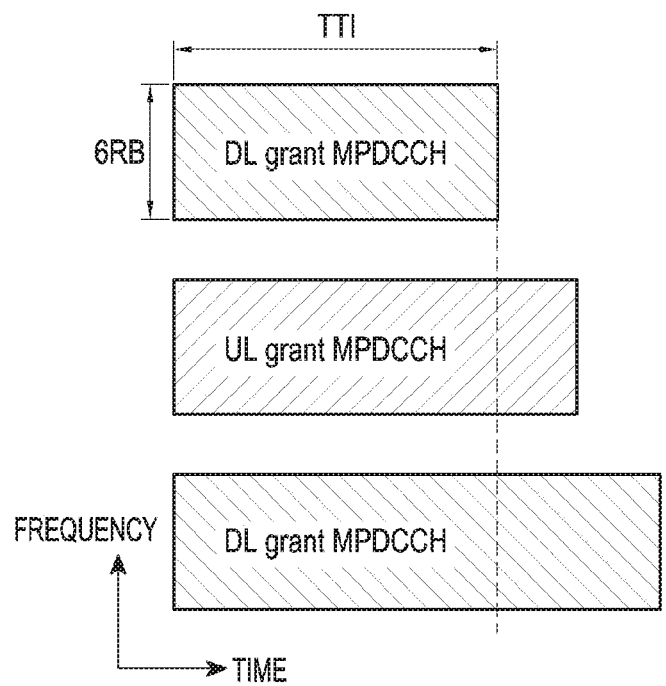
FIGS. 3A and 3B illustrate a resource area for uplink and a resource area for downlink according to an embodiment.
Figure 3B:
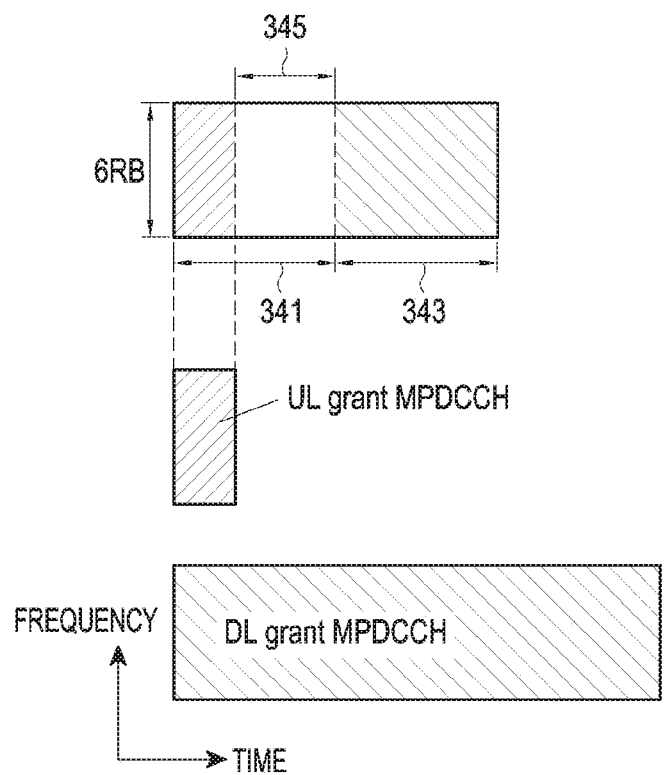

FIGS. 3A and 3B illustrate a resource area for uplink and a resource area for downlink according to an embodiment.

Referring to FIGS. 3A and 3B, the BS may determine information on timing at which information on the PDSCH and information on the PUSCH are transmitted.

Prior to DL data of the eMTC UE being transmitted through the PDSCH, the BS may transmit a DL grant containing resource allocation information of the PDSCH (that is, information on a time at which the corresponding PDSCH is transmitted, RBs used for the transmission, and repetitive transmission indicating how many times the transmission is performed) through the MPDCCH, which may be referred to as a DL grant MPDCCH 310.

The BS may determine the time at which the PDSCH and the DL grant MPDCCH are transmitted, RBs used for the transmission, and repetitive transmission indicating how many times the transmission is performed. The determination of the BS may be referred to as DL scheduling, and a subject of the BS that performs the DL scheduling may be referred to as a DL scheduler. Based on the result of scheduling by the DL scheduler, both the allocated DL grant MPDCCH and PDSCH may be transmitted through DL resources.

Similarly, DL data of the eMTC UE may be transmitted through the PDSCH. Prior to this transmission, the BS may transmit a UL grant containing resource allocation information of the PDSCH (i.e., information on a time at which the corresponding PDSCH is transmitted, RBs used for the transmission, and repetitive transmission indicating how many times the transmission is performed) through the MPDCCH, which may be referred to as a UL grant MPDCCH.

The BS may determine the time at which the UL grant MPDCCH is transmitted, RBs used for the transmission, and repetitive transmission indicating how many times the transmission is performed. The determination of the BS may be referred to as UL scheduling, and a subject of the BS that performs the UL scheduling may be referred to as a UL scheduler. Based on the result of scheduling by the UL scheduler, the allocated PUSCH may be transmitted through UL resources, but the UL grant MPDCCH may be transmitted through DL resources. The BS may include at least one of the DL scheduler which may schedule the PDSCH, and the UL scheduler which may schedule the PUSCH.

The DL scheduler and the UL scheduler may schedule DL resources and UL resources, respectively, but both the DL grant and the UL grant may be transmitted through a limited PDCCH, so that DL scheduling by the DL scheduler and UL scheduling by the UL scheduler may relate to each other.

Accordingly, even though DL scheduling and UL scheduling should be performed through the same PDCCH, the size (or the number) of DL grants and the size (the number) of UL grants which change according to circumstances cannot exceed a capability of the limited PDCCH. If the DL scheduler fully fills the MPDCCH with the DL grants, the UL scheduler cannot allocate the UL grants.

As a result, DL scheduling and UL scheduling are relevant to each other, and the UL scheduler and the DL scheduler should cooperatively allocate the MPDCCH.

When the DL scheduler and the UL scheduler included in the BS cooperatively schedule DL/UL data of the eMTC UE, all DL resources which can be used for transmitting the DL grant MPDCCH by the DL scheduler and for transmitting the UL grant MPDCCH by the UL scheduler may be referred to as MPDCCH resources or as "downlink physical control channel resources".

Referring to FIG. 3A, 20 UL grants or DL grants are transmitted through the MPDCCH during one TTI. When the DL scheduler first performs DL scheduling on MPDCCH resources without any restriction, the UL scheduler may perform scheduling only with the remaining MPDCCH resources other than the resources which the DL scheduler has allocated. When the UL scheduler first performs scheduling, the DL scheduler may perform scheduling later.

At this time, a device that first performs scheduling may monopolize resources and a scheduler that allocates resources later may not receive any resources. If the DL scheduler fully fills the MPDCCH with the DL grants, the UL scheduler cannot allocate the UL grants. Accordingly, a problem of allocation with only one of the UL grant and the DL grant may occur.

Referring to FIG. 3B, the BS may divide resources 341 and 343 allocated for the UL grant and the DL grant based on a static reference. Each of the DL scheduler and the UL scheduler may perform scheduling exclusively using the statically divided resources.

Accordingly, a problem in which one scheduler does not receive resources at all does not occur, but if an amount of resources required by each subject that performs scheduling is dynamically changed, resources cannot be efficiently used. For example, when an amount of one of the UL grants and the DL grants which should be transmitted during one TTI is smaller than an amount of exclusively allocated resources, resources 345 may be wasted in one area and data transmission may be delayed in another area since grant information which should be transmitted during one TTI cannot be transmitted therein.

Figure 4:
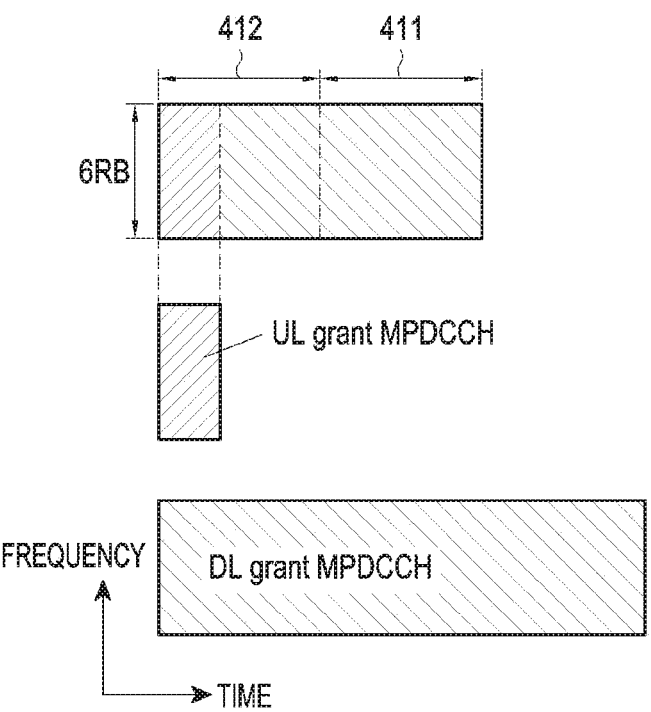
FIG. 4 illustrates dynamic allocation of physical channel resources according to an embodiment.

FIG. 4 illustrates dynamic allocation of physical channel resources according to an embodiment.

Referring to FIG. 4, the BS may dynamically divide MPDCCH resources into resources 411 (referred to as a "downlink-exclusive resource area") used for allocating the DL grant MPDCCH by the DL scheduler and resources 412 (referred to as an "uplink-exclusive resource area") used for allocating the UL grant MPDCCH by the UL scheduler, and each of the DL scheduler and the UL scheduler may perform scheduling exclusively using the divided resources. That is, the BS may dynamically divide the PDCCH into the downlink-exclusive resource area 411 and the uplink-only resource area 412. If there is no data to be transmitted to the eMTC UE, one of the UL scheduler and the DL scheduler may hand over a scheduling opportunity to the other scheduler to allocate resources.

Each of the UL scheduler and the DL scheduler may have an exclusive resource area which each subject has. An opportunity to allocate resources by the DL scheduler in the DL-exclusive resource area 411 and an opportunity to allocate resources by the UL scheduler in the UL-exclusive resource area 412 may be alternately generated. However, if there is no grant which one of the UL scheduler and the DL scheduler transmits, resource allocation may end early and a resource allocation opportunity is handed over to the other scheduler.

When there are sufficient pieces of uplink data or downlink data to be transmitted, an amount of resource areas required for allocating resources by one of the UL scheduler and the DL scheduler may exceed the corresponding exclusive resource area, and if the required amount of resource areas exceeds the exclusive resource area, the resource allocation opportunity may be assigned to the other scheduler in its own exclusive resource area.

Accordingly, in the disclosure, each device that performs scheduling can secure resources which can be exclusively used, thereby curing the problem in which one scheduler cannot allocate any resources. Resources which can be used by each subject that performs scheduling are dynamically divided, and thus even through an amount of resources required by each subject that performs scheduling is dynamically changed, resources can be efficiently used.

Figure 5A:
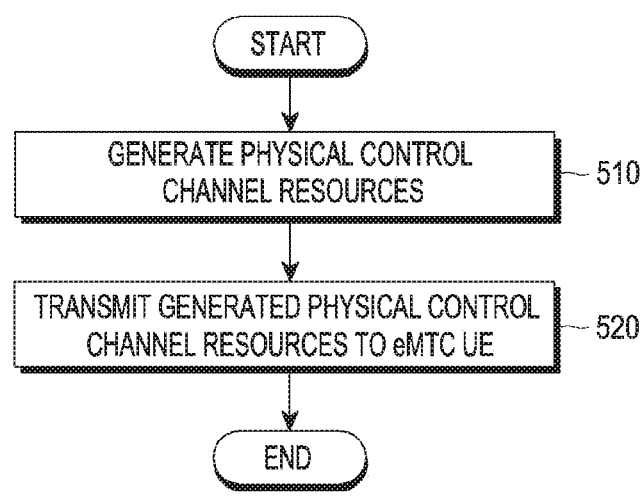
FIGS. 5A and 5B illustrate a method of allocating resources by a BS according to an embodiment.
Figure 5B:
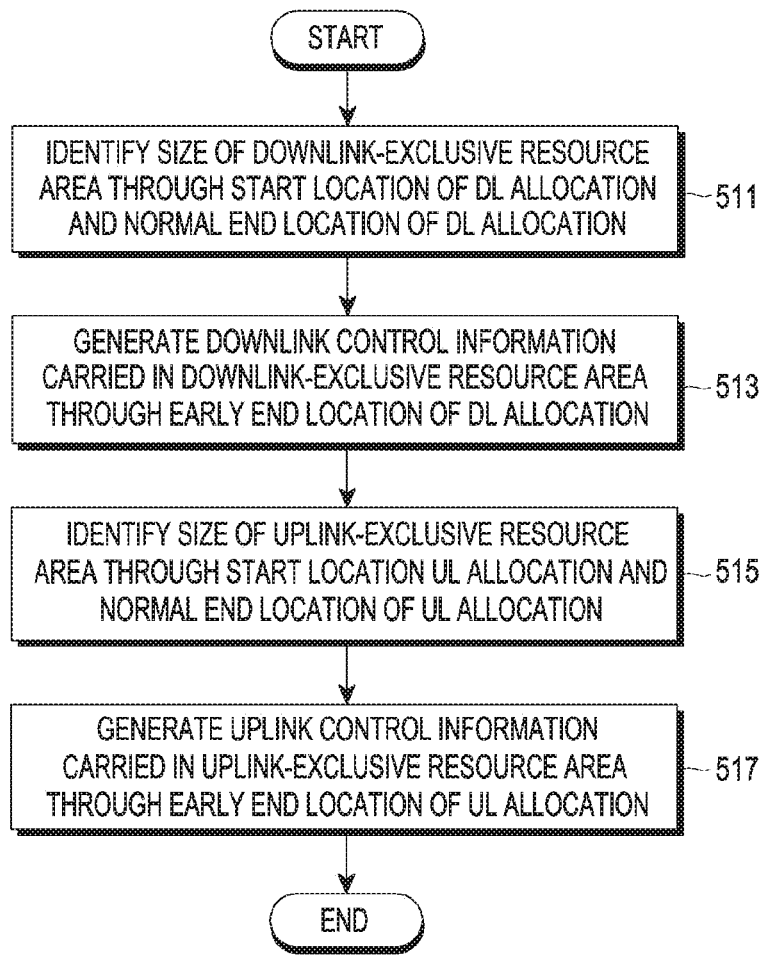

FIGS. 5A and 5B illustrate a method of allocating resources by the BS according to an embodiment.

Referring to FIG. 5A, the BS generates physical control channel resources including DL grants (referred to as "downlink control information") carried in the downlink-exclusive resource area and UL grants (referred to as "uplink control information") carried in the uplink-exclusive resource area in step 510. The physical control channel resources may be an MPDCCH resources, and the physical control channel resources may be divided into a downlink-exclusive resource area and an uplink-exclusive resource area.

The DL scheduler may exclusively use MPDCCH resources for a particular time duration (referred to as a "first time resource") based on the downlink-exclusive resource area, and then the UL scheduler may use MPDCCH resources for a particular time duration (referred to as a "second time resource") based on the uplink-exclusive resource area. The BS may repeat the operation. The first time resource may be defined as a time duration of resources through which the DL scheduler can allocate DL data and the second time resource may be defined as a time duration of resources through which the UL scheduler can allocate UL data.

The time duration for which the DL scheduler exclusively uses MPDCCH resources may be referred to as DL turn or the first time resource, and the time duration for which the UL scheduler exclusively uses MPDCCH resources may be referred to as UL turn or the second time resource. Switching between the DL turn and the UL turn may indicate that each subject that performs scheduling gives and takes a turn. The UL scheduler exchanges turns with the DL scheduler and the second time resource may start after the first time resource ends. The end of the first time resource may refer to the end of the time duration of resources for DL data.

A length of the DL turn and a maximum length of the UL turn may be predetermined based on the downlink-exclusive resource area and the uplink-exclusive resource area. Accordingly, when a time corresponding to a maximum length of a predetermined turn passes after each subject that performs scheduling takes the turn from the other subject, the subject may give the turn to the other subject. Therefore, the maximum length of the DL turn and the UL turn may be predetermined.

Referring to FIG. 5B, the BS identifies the size of the downlink-exclusive resource area through a start time point of the first time resource (referred to as a "DL allocation start location") and an end time point of the first time resource (referred to as a "normal end location of DL allocation") in step 511.

Since the downlink-exclusive resource area has the maximum size on which downlink control information is carried, the BS cannot allocate downlink control information on resources of the physical control channel according to the downlink-exclusive resource area even though there is DL data to be transmitted. A start location of the downlink-exclusive resource area may be referred to as a start time point of the first time resource or a DL allocation start location. When as much downlink control information as possible is carried in the downlink-exclusive resource area, the end time point of the first time resource (referred to as the "normal end location of DL allocation") may indicate the location of the last carried downlink control information.

The BS may change the end time point of the first time resource and indicate the changed end time point of the first time resource as an early end location of DL allocation. The BS may generate downlink control information carried in the downlink-exclusive resource area identified in consideration of the early end location of DL allocation in step 513. The early end location of DL allocation will be described in detail with reference to FIG. 8.

If there is no more data to be transmitted, each subject that performs scheduling may immediately give the opportunity to perform the scheduling (i.e., the turn) to the other subject even though a time corresponding to a predetermined maximum turn length does not pass. Therefore, the actual lengths of DL turn and UL turn may be dynamically changed.

After carrying downlink control information in the downlink-exclusive resource area, the BS may carry uplink control information on physical control channel resources. However, after carrying uplink control information in the uplink-exclusive resource area, the BS may carry downlink control information on physical control channel resources. Allocation of uplink control information and allocation of downlink control information may be alternately performed.

In other words, the present disclosure does not limit which is first allocated by the BS between the uplink control information and the downlink control information.

The BS identifies the size of the uplink-exclusive resource area through an end time point of the second time resource (referred to as a "normal end location of UL allocation") and a start time point of the second time resource (referred to as a "start location of UL allocation") in step 515. The start location of the uplink-exclusive resource area may be referred to as the start time point of the second time resource or the start location of UL allocation. When as much uplink control information as possible is carried in the uplink-exclusive resource area, the end time point of the second time resource (referred to as the "normal end location of UL allocation") may indicate the location of the last carried uplink control information.

The BS may change the end time point of the second time resource and may indicate the changed end time point of the second time resource as an early end location of UL allocation. The BS generates uplink control information carried in the identified uplink-exclusive resource area in consideration of the early end location of UL allocation in step 517. The early end location of UL allocation corresponds to the early end location of DL allocation and will be described in detail with reference to FIG. 9.

Referring back to FIG. 5A, after carrying both the downlink control information and the uplink control information on physical control channel resources, the BS transmits generated physical control channel resources to at least one eMTC UE in step 520.

Figure 6:
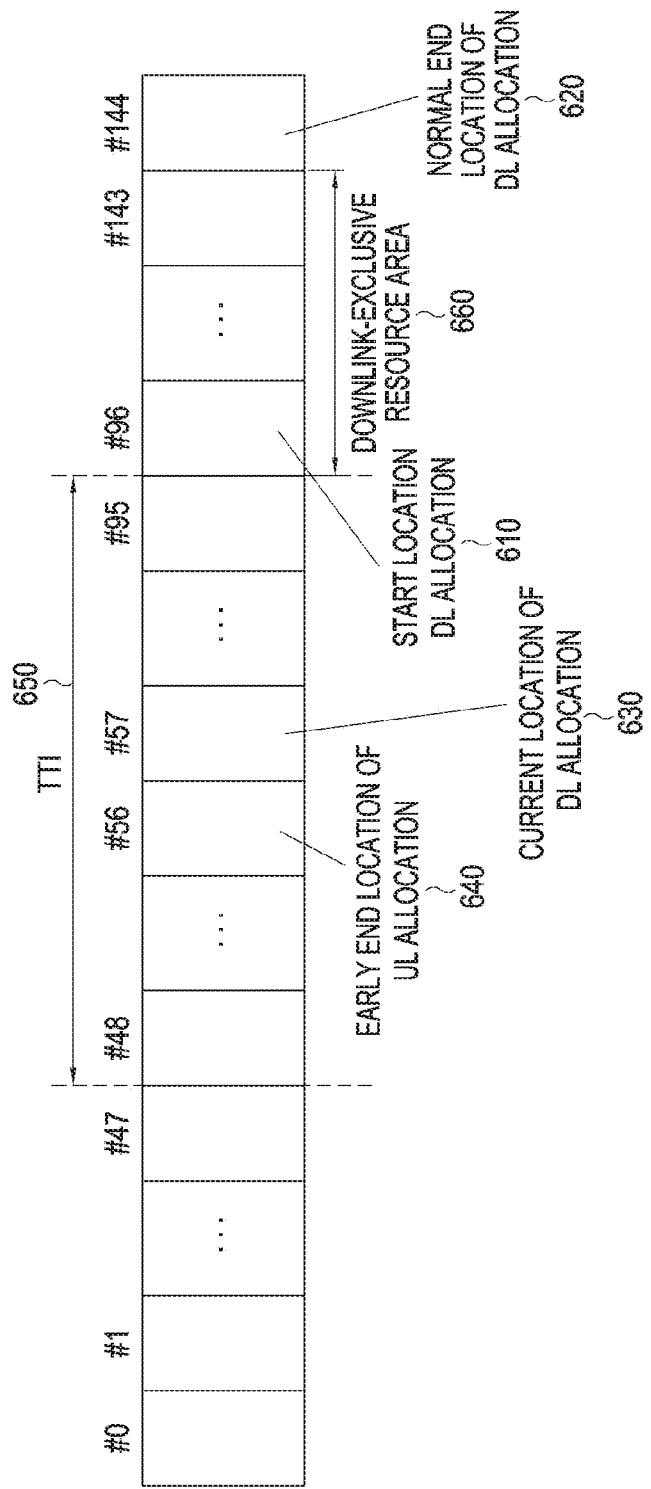
FIG. 6 illustrates a downlink-exclusive resource area in which control information is carried according to an embodiment.

FIG. 6 illustrates a downlink-exclusive resource area in which control information is carried according to an embodiment.

Referring to FIG. 6, the BS may identify the downlink-exclusive resource area before allocating the downlink control information on the physical control channel resources. The physical control channel resources may be the MPDCCH resources.

The BS may identify the size of the downlink-exclusive resource area based on a start location 610 of DL allocation and a normal end location 620 of DL allocation.

A current location 630 of DL allocation, the start location 610 of DL allocation, the normal end location 620 of DL allocation, and an early end location 640 of DL allocation may be identified by numbers indicating subframes and may be indicated by absolute subframe numbers (ABSs).

When allocation of uplink control information to physical control channel resources ends, the current location 630 of DL allocation may indicate a number of a subsequent subframe of the ended subframe 640. When the DL turn is taken from the UL scheduler, the current location 630 of DL allocation may be a start location of the DL turn. For example, when allocation of uplink control information ends in subframe #56, the current location of DL allocation may be subframe #57.

The start location 610 of DL allocation may be defined as a location of a subframe in physical control channel resources on which downlink control information is carried.

The normal end location 620 of DL allocation may depend on a search space of the MPDCCH. The BS may define the location of the MPDCCH for each eMTC UE, and the location at which the eMTC UE can find its own MPDCCH may be referred to as a search space. Search space may be individually configured for each eMTC UE and may be different for every eMTC UE.

The search space may depend on downlink repetitive transmission. The number of repetitive transmissions or frequency hopping patterns may be different for every eMTC UE. As the number of downlink repetitive transmissions is larger, the size of search space may become larger according to the number of downlink repetitive transmissions.

The search space may depend on information on a specific subframe to which resources for eMTC communication cannot be allocated. Since resource areas of eMTC communication are included in some resource areas of LTE communication, resource allocation for eMTC Communication may not be allowed for a specific subframe. The specific subframe may be referred to as an invalid subframe.

The normal end location of DL allocation may be calculated by the start location of DL allocation, the search space, and the invalid subframe. The normal end location (dlNormalEndAbs) of DL allocation may be calculated by Equation (1), as follows.

$$dlNormalEndAbs = G*limitRMax*(ceil(dlStartAbs/(G*limitRMax))+1)-1 \quad (1)$$

In Equation (1), G is a parameter determined by an invalid subframe located within the search space, limitRMax is a parameter indicating an increase in the search space by downlink repetitive transmission, and dlStartAbs is a parameter indicating a start location of DL allocation. Accordingly, G*limitRMax may indicate a search space considering the invalid subframe and the number of downlink repetitive transmissions.

G may indicate a value designated as fdd-r13 of mPDCCH-startSF-CSS-RA-r13. Parameters of SIB2(SystemInformationBlockType2) may include PRACH-Config, and PRACH-Config may depend on mPDCCH-startSF-CSS-RA-r13. That is, G may indicate a value designated as SIB2>>PRACH-Config>>mPDCCH-startSF-CSS-RA-r13>>fdd-r13.

For example, when two invalid subframes are located in the MPDCCH of 10 ms, G may be calculated as 1.5. G may be determined through a table between the invalid subframe and G, and the table may be stored in a memory of the BS in advance.

For example, when allocation of uplink control information ends in subframe #56 in FIG. 6, the start location of DL allocation is #57, G is 1.5, and limitRMax is 32. The normal end location of DL allocation may be calculated as #143 by Equation (1).

Even though allocation of uplink control information ends in subframe #56, the BS cannot start allocation of downlink control information at the subsequent location. Since the BS can start allocation of resources in units of TTIs, allocation of downlink control information may be started at the start location 610 of DL allocation in subframe #96. The start location 610 of DL allocation may be calculated as the location of the first subframe of a TTI 660 subsequent to a TTI 650 including the normal end location of UL allocation or the early end location of UL allocation.

Figure 7A:
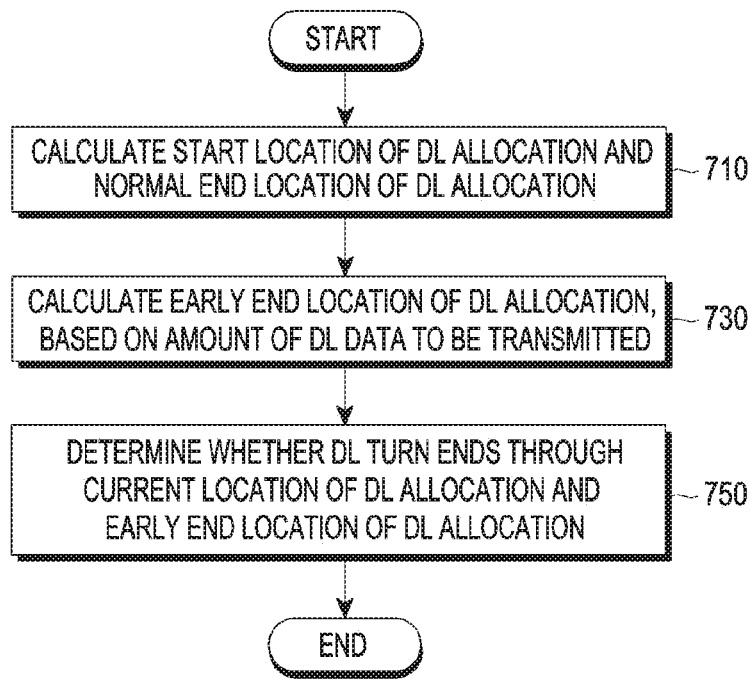
FIGS. 7A and 7B illustrate the relation between resource allocation for downlink control information and resource allocation for uplink control information according to an embodiment.
Figure 7B:
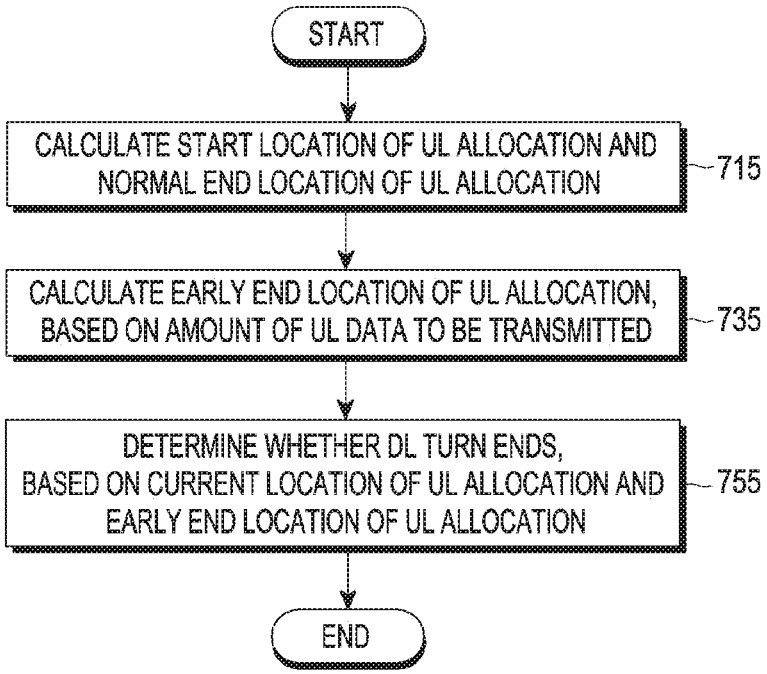

FIGS. 7A and 7B illustrate the relation between resource allocation for downlink control information and resource allocation for uplink control information according to an embodiment.

Referring to FIGS. 7A and 7B, upon taking the DL turn back according to the end of the UL turn, the DL scheduler included in the BS calculates the start location of DL allocation and the normal end location of DL allocation in step 710.

The BS calculates the early end location of DL allocation based on an amount of DL data to be transmitted in step 730.

A detailed method of calculating the early end location of DL allocation will be described with reference to FIG. 8.

The BS determines whether the DL turn ends based on the current location of DL allocation and the early end location of DL allocation calculated using the normal end location of DL allocation and then generates uplink control information carried in the uplink-exclusive resource area in step 750. The BS may update the current location of DL allocation in a process of calculating the early end location of DL allocation.

In FIG. 7B, when the DL turn ends, the UL scheduler included in the BS calculates the start location of UL allocation and the normal end location of UL allocation in step 715.

The BS calculates the early end location of UL allocation based on an amount of UL data to be transmitted in step 735. A detailed method of calculating the early end location of UL allocation will be described with reference to FIG. 9.

The BS determines whether the UL turn ends based on the current location of UL allocation and the early end location of UL allocation calculated using the normal end location of UL allocation in step 755 and then generates downlink control information carried in the downlink-exclusive resource area.

Figure 8:
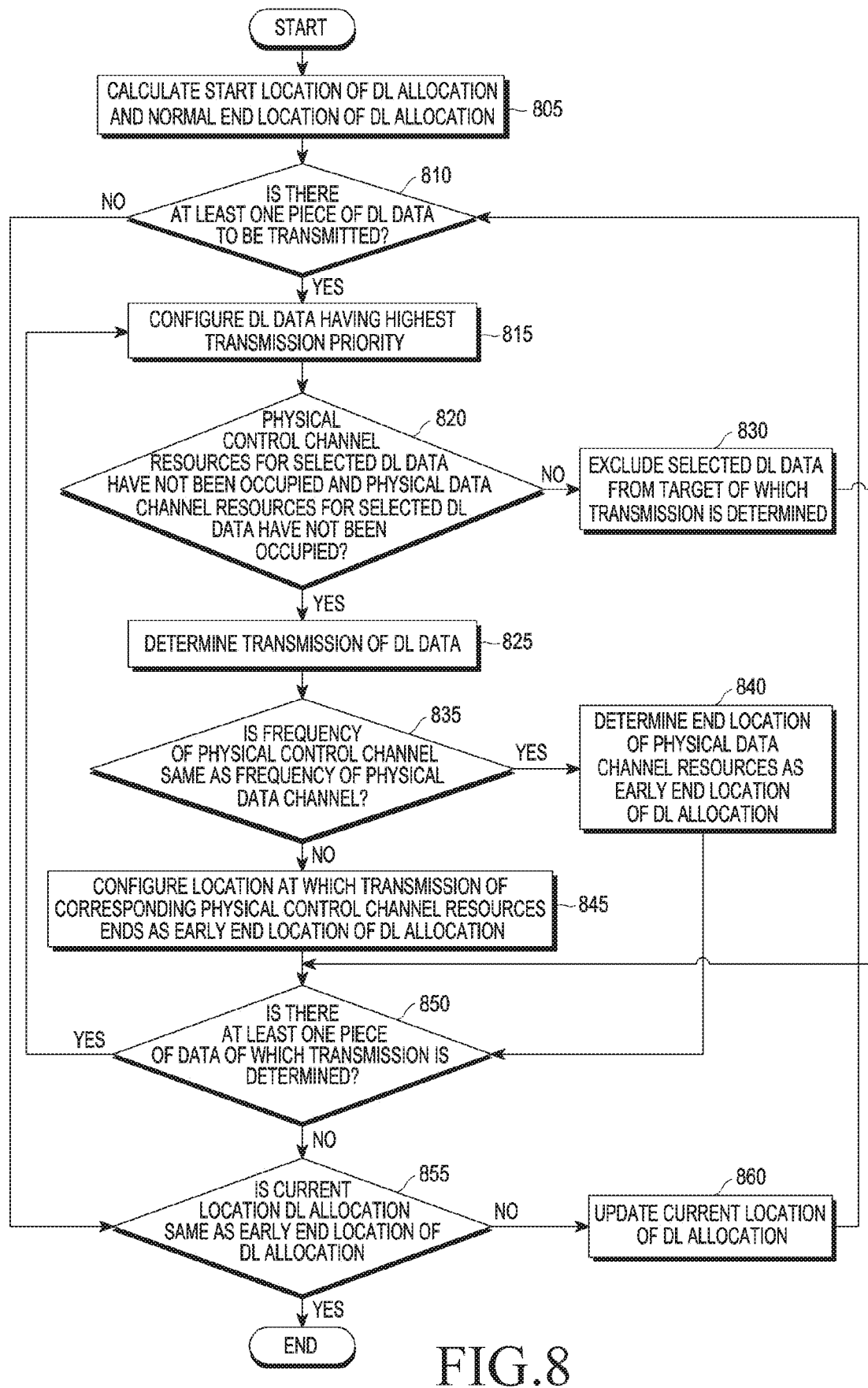
FIG. 8 illustrates a method of allocating downlink control information to a downlink-exclusive resource area according to an embodiment.

FIG. 8 illustrates a method of allocating downlink control information in a downlink-exclusive resource area according to an embodiment.

Referring to FIG. 8, when the UL turn ends, the DL scheduler takes the DL turn back from the UL scheduler, and then starts the DL turn. The DL scheduler included in the BS calculates the start location of DL allocation and the normal end location of DL allocation in step 805.

When the DL turn starts, the DL scheduler may calculate the start location of DL allocation and the normal end location of DL allocation only one time. The DL scheduler may update the early end location of DL allocation in every subframe. The start location of DL allocation may be determined as the location of a subframe at which DL allocation starts in a TTI subsequent to a TTI including a subframe at which the UL turn ends.

The DL scheduler identifies whether at least one piece of DL data to be transmitted exists in a buffer in step 810.

When there is at least one piece of DL data to be transmitted ("Yes" in step 810), the DL scheduler selects DL data having the highest transmission priority among the DL data to be transmitted in step 815. Information indicating the transmission priority may be included in the DL grant.

However, when there is no DL data ("No" in step 810), the DL scheduler identifies whether the current location of DL allocation is the same as the early end location of DL allocation and determine whether to end the DL turn in step 855.

When DL data to be transmitted is selected, the DL scheduler may update the early end location of DL allocation. The DL scheduler may calculate the early end location (dlEffEndAbs) of DL allocation through Equation (2), as follows.

$$dlEffEndAbs = max(dlEffEndAbs, min(currentAbs+1, dlNormalEndAbs)) \quad (2)$$

The current location of DL allocation may be updated through Equation (2). When the early end location (dlEffEndAbs) of DL allocation is first calculated after the UL turn ends, dlEffEndAbs input to max( ) may be initially configured by default.

The DL scheduler identifies whether resources (physical control channel resources) for allocating the MPDCCH for the selected DL data have not been occupied and resources (physical data channel resources) for allocating the PDSCH for the selected DL data have not been occupied in step 820.

When resources for allocating the MPDCCH have been occupied for the selected DL data (condition 1) and resources for allocating the PDSCH have been occupied for the selected DL data (condition 2) ("No" in step 820), the DL scheduler determines to not transmit the selected DL data. When resources for allocating the MPDCCH have been occupied for the selected DL data and resources for allocating the PDSCH have been occupied for the selected DL data, the DL scheduler excludes the selected DL data from targets of which transmission is determined in step 830.

When resources for allocating the MPDCCH have not been occupied for the selected DL data and resources for allocating the PDSCH have not been occupied for the selected DL data ("Yes" in step 820), the DL scheduler determines to transmit the selected DL data in step 825. The DL scheduler may determine transmission of DL data only when the resource area of the MPDCCH in which the DL grant indicating whether the selected DL data is carried on the PDSCH and indicating the resource area of the PDSCH to which the DL data is allocated is carried.

In addition the two conditions (condition 1 and condition 2), the DL scheduler may additionally determine whether the following Equation (3) is satisfied.

$$mpdcchEndAbs <= dlNormalEndAbs \quad (3)$$

In Equation (3), mpdcchEndAbs denotes an ABS at which repetitive transmission of the MPDCCH of the selected DL data ends. The location of the subframe of the repeatedly transmitted MPDCCH being larger than the normal end location of DL allocation may mean that the location leaves the downlink-exclusive resource area, so that the end location of the repeatedly transmitted MPDCCH should be smaller than the normal end location of DL allocation.

In order to transmit DL data through the PDSCH, a DL grant MPDCCH should be first transmitted. The PDSCH may be transmitted in the same frequency resource area as the MPDCCH or in a different frequency resource area from the MPDCCH.

After determining transmission of the selected DL data, the DL scheduler identifies whether the frequency of physical control channel resources is the same as the frequency domain of physical data channel resources in step 835.

When the frequency of the physical control channel resources is different from the frequency domain of the physical data channel resources ("No" in step 835), the DL scheduler configures the location at which transmission of the corresponding physical control channel resources ends as the early end location of DL allocation in step 845.

The DL scheduler may perform scheduling in a specific NB frequency domain. When the frequency of the physical control channel resources is transmitted in an NB frequency domain different from the frequency of physical data channel resources, resource allocation for DL data transmission through the PDSCH may not be considered.

When the PDSCH of DL data is transmitted through resources other than the MPDCCH resources, the DL scheduler may calculate the early end location (dlEffEndAbs) of DL allocation through Equation (4), as follows.

$$dlEffEndAbs = max(dlEffEndAbs, mpdcchEndAbs) \quad (4)$$

Accordingly, the DL turn may continue to the location at which transmission of the corresponding MPDCCH ends.

However, when the frequency of the physical control channel resources is the same as the frequency domain of the physical data channel resources ("Yes" in step 835), the DL scheduler determines the end location of physical data channel resources as the early end location of DL allocation in step 840.

When the frequency of the physical control channel resources is transmitted in the same NB frequency domain as the frequency of physical data channel resources, the DL scheduler should allocate resources in consideration of resource allocation for DL data transmission through the PDSCH. When the PDSCH of DL data is transmitted through the same resources as the MPDCCH, the DL scheduler may calculate the early end location (dlEffEndAbs) of DL allocation through Equation (5), as follows.

$$dlEffEndAbs = max(dlEffEndAbs, pdschEndAbs) \quad (5)$$

In Equation (5), pdschEndAbs denotes the location at which repetitive transmission of the PDSCH of selected DL data ends, that is, a subframe number. Accordingly, the DL turn may continue to the location at which transmission of the PDSCH transmitted after the corresponding MPDCCH ends.

After determining transmission of the selected DL data, the DL scheduler may manage resources allocated to transmission of the MPDCCH of the selected DL data as pre-occupied resources and manage resources allocated to transmission of the PDSCH of the selected DL data as pre-occupied resources.

Thereafter, the DL scheduler identifies whether there is at least one piece of DL data of which transmission is determined in step 850. When there is at least one piece of data ("Yes" in step 850), the DL scheduler repeats a process of selecting DL data having the highest transmission priority among the DL data to be re-transmitted in step 815.

When there is no data left ("No" in step 850), the DL scheduler identifies whether the updated current location of DL allocation is the same as the updated early end location of DL allocation in step 855.

When the updated current location of DL allocation is not the same as the updated early end location of DL allocation ("No" in step 855), the DL scheduler updates the current location of DL allocation in step 860 and re-identifies whether there is at least one piece of DL data to be transmitted in a buffer in step 810.

When the updated current location of DL allocation is the same as the updated early end location of DL allocation ("Yes" in step 855), the DL scheduler ends the DL turn and give the UL turn to the UL scheduler.

Figure 9:
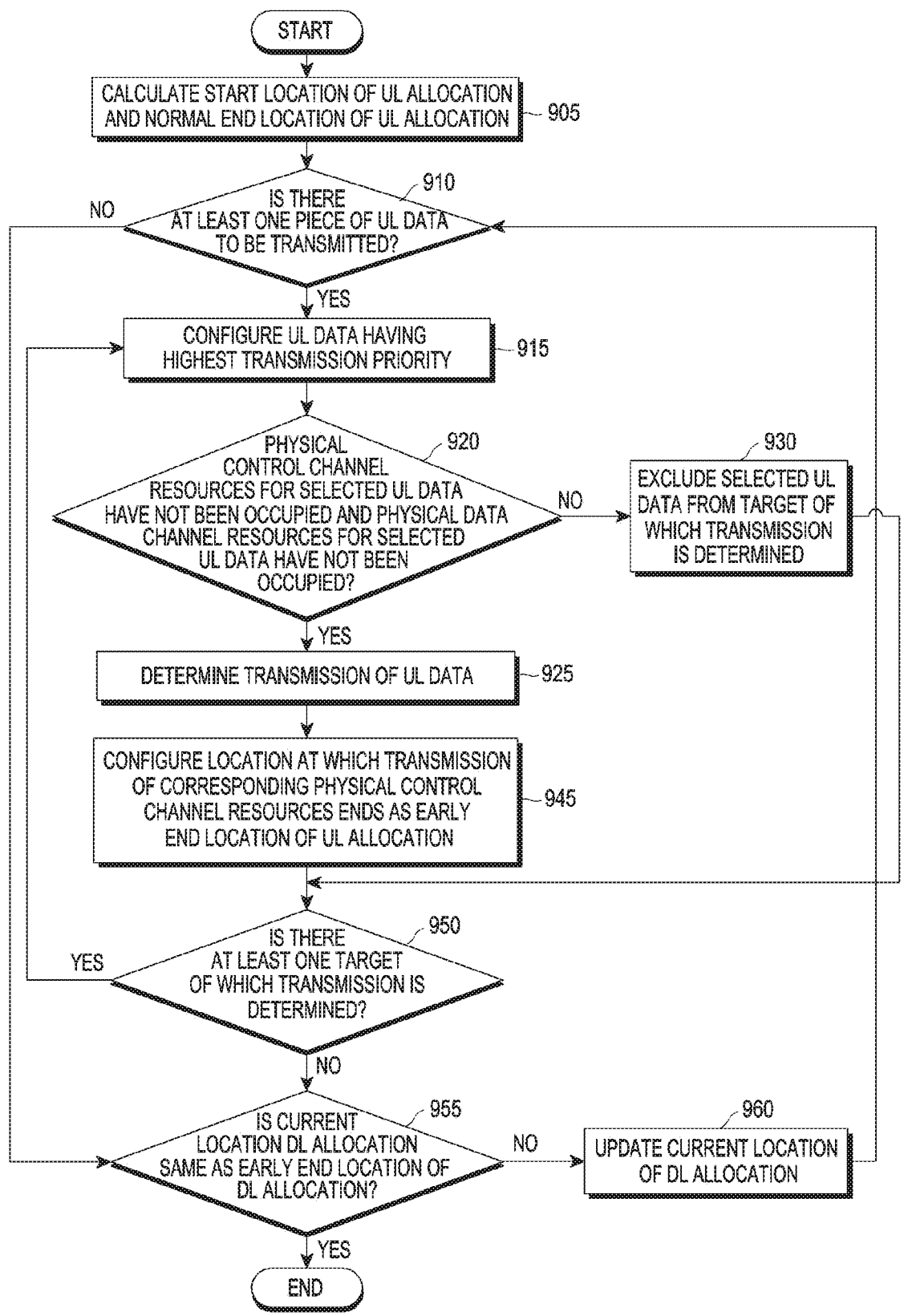
FIG. 9 illustrates a method of allocating uplink control information to an uplink-exclusive resource area according to an embodiment.

FIG. 9 illustrates a method of allocating uplink control information to an uplink-exclusive resource area according to an embodiment.

Referring to FIG. 9, when the DL turn ends, the UL scheduler takes the UL turn back from the DL scheduler and then starts the UL turn. The UL scheduler included in the BS calculates the start location of UL allocation and the normal end location of DUL allocation in step 905.

When the UL turn starts, the UL scheduler may calculate the start location of UL allocation and the normal end location of UL allocation only one time. The UL scheduler may update the early end location of UL allocation in every subframe. The start location of UL allocation may be determined as the location of a subframe at which UL grant allocation starts in a TTI subsequent to a TTI including a subframe at which the DL turn ends.

The UL scheduler identifies whether there is at least one piece of UL data to be transmitted in the buffer in step 910.

When there is at least one piece of UL data to be transmitted ("Yes" in step 910), the UE scheduler configures UL data having the highest transmission priority among the UL data to be transmitted in step 915. Information indicating the transmission priority may be included in the UL grant.

However, when there is no UL data ("No" in step 910), the UL scheduler identifies whether the current location of UL allocation is the same as the early end location of UL allocation and determine whether to end the UL turn in step 955.

When UL data to be transmitted is selected, the UL scheduler may update the early end location of UL allocation. The UL scheduler may calculate the early end location (ulEffEndAbs) of UL allocation through Equation (6), as follows.

$$\text{ulEffEndAbs}=\max(\text{ulEffEndAbs},\min(\text{currentAbs}+1, \text{ulNormalEndAbs})) \quad (6)$$

The current location of UL allocation may be updated through Equation (6). When the early end location (ulEffEndAbs) of UL allocation is first calculated after the DL turn ends, (ulEffEndAbs) input to max( ) may be initially configured by default.

The UL scheduler identifies whether resources (physical control channel resources) for allocating the MPDCCH for the selected UL data have not been occupied and resources (physical data channel resources) for allocating the PUSCH for the selected UL data have not been occupied in step 920.

When resources for allocating the MPDCCH have been occupied for the selected UL data (condition 1) and resources for allocating the PUSCH have been occupied for the selected UL data (condition 2) ("No" in step 920), the UL scheduler determines to not transmit the selected UL data. When resources for allocating the MPDCCH have been occupied for the selected UL data and resources for allocating the PUSCH have been occupied for the selected UL data ("No" in step 920), the UL scheduler excludes the selected UL data from targets of which transmission is determined in step 930.

When resources for allocating the MPDCCH have not been occupied for the selected UL data and resources for allocating the PUSCH have not been occupied for the selected UL data ("Yes" in step 920), the UL scheduler determines to transmit the selected UL data in step 925. The UL scheduler may determine transmission of UL data only when the resource area of the MPDCCH is determined, the MPDCCH carrying the UL grant indicating whether the selected UL data is carried on the PUSCH and indicating the resource area of the PUSCH to which the UL data is allocated.

In addition to the two conditions (condition 1 and condition 2), the UL scheduler may additionally identify whether the following Equation (7) is satisfied.

$$\text{mpdcchEndAbs}<=\text{ulNormalEndAbs} \quad (7)$$

In Equation (7), mpdcchEndAbs denotes an ABS at which repetitive transmission of the MPDCCH of the selected UL data ends. The location of the subframe of the repeatedly transmitted MPDCCH being larger than the normal end location of UL allocation may mean that the location leaves the uplink-exclusive resource area, so that the end location of the repeatedly transmitted MPDCCH should be smaller than the normal end location of UL allocation.

In order to transmit UL data through the PUSCH, a UL grant MPDCCH should be first transmitted. The PUSCH is not transmitted in the same frequency resource area as MDCCH resources. Unlike the DL scheduler, after determining transmission of the selected UL data, the UL scheduler may not identify whether the frequency of physical control channel resources is the same as the frequency domain of physical data channel resources.

The UL scheduler configures the location at which transmission of the corresponding physical control channel resources ends as the early end location of UL allocation in step 945.

The UL scheduler may calculate the early end location (ulEffEndAbs) of UL allocation through Equation (8), as follows.

$$\text{ulEffEndAbs}=\max(\text{ulEffEndAbs},\text{mpdcchEndAbs}) \quad (8)$$

Accordingly, the UL turn may continue to the location at which transmission of the corresponding MPUCCH ends.

After determining transmission of the selected UL data, the UL scheduler may manage resources allocated to transmission of the MPUCCH of the selected UL data as pre-occupied resources and manage resources allocated to transmission of the PUSCH of the selected UL data as pre-occupied resources.

Thereafter, the UL scheduler identifies whether there is at least one piece of UL data of which transmission should be determined in step 950. When there is at least one piece of UL data left ("Yes" in step 950), the UL scheduler repeats a process of selecting UL data having the highest transmission priority among the UL data to be re-transmitted in step 910.

When there is no data left ("No" in step 950), the UL scheduler identifies whether the updated current location of UL allocation is the same as the updated early end location of UL allocation in step 955.

When the updated current location of UL allocation is not the same as the updated early end location of UL allocation ("No" in step 955), the DL scheduler updates the current location of UL allocation in step 960 and re-identifies whether there is at least one piece of UL data to be transmitted in a buffer in step 910.

When the updated current location of UL allocation is the same as the updated early end location of UL allocation ("Yes" in step 955), the UL scheduler ends the UL turn and return the DL turn to the DL scheduler.

Figure 10:
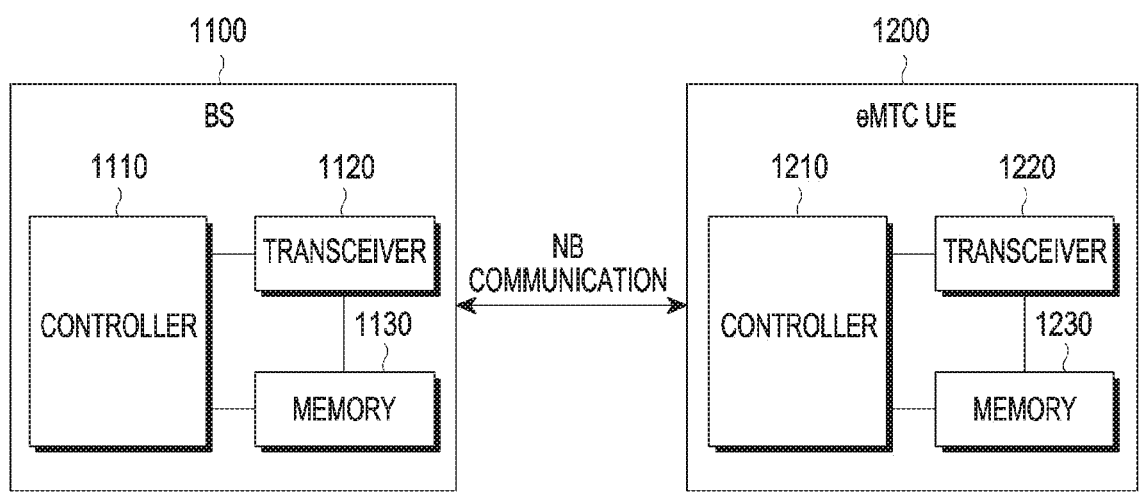
FIG. 10 illustrates the configuration of a BS and an eMTC UE according to an embodiment.

FIG. 10 illustrates the configuration of a BS and an eMTC UE according to an embodiment.

Referring to FIG. 10, a BS 1100 includes a transceiver 1120 for transmitting and receiving data to and from an eMTC UE 1200 or an LTE UE, a controller 1110 for controlling all operations of the BS 1100, and a memory 1130 including data to be transmitted to the eMTC UE 1200.

All schemes or methods performed by the BS described in the disclosure may be understood as being performed under a control of the controller 1110. However, the controller 1110 and the transceiver 1120 do not need to be implemented as separate devices and may be implemented as one element such as a single chip.

The eMTC UE 1200 includes a transceiver 1220 for transmitting and receiving data to and from the BS 1100, a controller 1210 for controlling all operations of the eMTC UE 1200, and a memory 1230 including data to be transmitted to the BS 1100.

All schemes or methods performed by the UE described in the disclosure may be understood as being performed under a control of the controller 1210. However, the controller 1210 and the transceiver 1220 do not need to be implemented as separate devices and may be implemented as one element such as a single chip.

The examples of the method, the configuration of the system, and the configuration of the apparatus illustrated in FIGS. 1 to 10 are not intended to limit the scope of the disclosure. That is, all elements or operations illustrated in FIGS. 1 to 10 should not be understood as necessary elements for implementing the disclosure and it may be implemented with only some elements without departing from the scope of the disclosure.

The operations may be implemented through a predetermined element within the BS or the UE apparatus of the communication system including a memory device storing a corresponding program code. That is, the controller of the eNB or the UE apparatus may perform the operations by reading and executing the program code stored in the memory device through a processor or a central processing unit (CPU).

Various elements and modules of the entity, the BS, or the UE used in the specification may operate by using a hardware circuit, such as a combination of a complementary metal oxide semiconductor-based logical circuit, firmware, software and/or hardware, or a combination of firmware and/or software inserted into a machine-readable medium. For example, various electrical structures and methods may be performed using transistors, logic gates, and electrical circuits such as application specific integrated circuit.

While the present disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. A method of allocating time resources of a downlink (DL) physical control channel by a base station (BS), the method comprising:
    allocating a first time resource for DL grant including information on at least one time resource used for transmission of DL data;
    transmitting the DL grant on the first time resource;
    allocating a second time resource for uplink (UL) grant including information on at least one time resource used for transmission of UL data, the second time resource starting after the first time resource ends; and
    transmitting the UL grant on the second time resource,
    wherein an end time point of the first time resource is changed based on an amount of the DL data, and
    wherein a duration of the first time resource is less than or equal to a first maximum value,
    wherein the first time resource and the second time resource are included in data resource area for DL data transmission.

2. The method of claim 1, wherein the first maximum value is based on at least one of a start time point of the first time resource and a number of repetitive transmissions of the DL data.

3. The method of claim 1, wherein allocating the first time resource for DL grant comprises:
    determining whether there is first data to be transmitted among the DL data;
    if there is the first data to be transmitted among the DL data, transmitting the DL grant on the first time resource, and
    if there is no first data to be transmitted among the DL data, changing the end time point of the first time resource.

4. The method of claim 3, wherein determining whether there is the first data to be transmitted among the DL data is performed in every subframe.

5. The method of claim 4, wherein the DL data is transmitted to at least one enhanced machine type communication (eMTC) UE.

6. The method of claim 3, wherein the end time point of the first time resource is changed according to whether transmission frequency resources of the first data to be transmitted are equal to transmission frequency resources of the DL grant.

7. The method of claim 1, wherein allocating the second time resource for UL grant comprises:
    determining whether there is second data to be received among the UL data;
    if there is the second data to be received among the UL data, transmitting the UL grant on the second time resource, and
    if there is no second data to be received among the UL data changing an end time point of the second time resource,
    wherein the end time point of the second time resource is changed based on an amount of the UL data, and
    wherein a duration of the second time resource is less than or equal to a second maximum value.

8. The method of claim 7, wherein the second maximum value is based on at least one of a start time point of the second time resource and a number of repetitive transmissions of the UL data.

9. The method of claim 7, wherein determining whether there is the second data to be received among the UL data is performed in every subframe.

10. The method of claim 9, wherein the UL data is received from at least one enhanced machine type communication (eMTC) UE.

11. A base station (BS) for allocating time resources of a downlink (DL) physical control channel, the BS comprising:
    a transceiver; and
    a controller configured to allocate a first time resource for DL grant including information on at least one time resource used for transmission of DL data;
    control the transceiver to transmit the DL grant on the first time resource;
    allocate a second time resource for uplink (UL) grant including information on at least one time resource used for transmission of UL data, the second time resource starting after the first time resource ends; and
    control the transceiver to transmit the UL grant on the second time resource,
    wherein an end time point of the first time resource is changed based on an amount of the DL data, and
    wherein a duration of the first time resource is less than or equal to a first maximum value,
    wherein the first time resource and the second time resource are included in data resource area for DL data transmission.

12. The BS of claim 11, wherein the first maximum value is based on at least one of a start time point of the first time resource and a number of repetitive transmissions of the DL data.

13. The BS of claim 11, wherein the controller is further configured to determine whether there is first data to be transmitted among the DL data;
    if there is the first data to be transmitted among the DL data, control the transceiver to transmit the DL grant on the first time resource; and
    if there is no first data to be transmitted among the DL data, change the end time point of the first time resource.

14. The BS of claim 13, wherein the controller is further configured to determine whether there is the first data to be transmitted among the DL data in every subframe.

15. The BS of claim 13, wherein the controller is further configured to change the end time point of the first time resource according to whether transmission frequency resources of the first data to be transmitted are equal to transmission frequency resources of the DL grant.

16. The BS of claim 11, wherein the controller is further configured to determine whether there is second data to be received among the UL data;
- if there is the second data to be received among the UL data, control the transceiver to transmit the UL grant on the second time resource; and
- if there is no second data to be received among the UL data, change an end time point of the second time resource,
- wherein the end time point of the second time resource is changed based on an amount of the UL data, and
- wherein a duration of the second time resource is less than or equal to a second maximum value.

17. The BS of claim 16, wherein the second maximum value is based on at least one of a start time point of the second time resource and a number of repetitive transmissions of the UL data.

18. The BS of claim 16, wherein the controller is further configured to determine whether there is the second data to be received among the UL data in every subframe.

19. The BS of claim 11, wherein the DL data is transmitted to at least one enhanced machine type communication (eMTC) UE.

20. The BS of claim 18, wherein the UL data is received from at least one enhanced machine type communication (eMTC) UE.

\* \* \* \* \*